(12) United States Patent
Kremmer et al.

(10) Patent No.: US 11,134,608 B2
(45) Date of Patent: Oct. 5, 2021

(54) METHOD AND MACHINE FOR PLANT CULTIVATION ON A FIELD

(71) Applicants: Deere & Company, Moline, IL (US); Ribouleau Monosem, Largeasse (FR)

(72) Inventors: Martin Kremmer, Bettendorf, IA (US); Roland Werner, Edingen-Neckarhausen (DE); Benoit P. Masson, La Chapelle Saint Laurent (FR); John C. Mann, Geneseo, IL (US)

(73) Assignee: Deere & Company, Moline, IL (US)

( * ) Notice: Subject to any disclaimer, the term of this patent is extended or adjusted under 35 U.S.C. 154(b) by 256 days.

(21) Appl. No.: 16/356,649

(22) Filed: Mar. 18, 2019

(65) Prior Publication Data

US 2019/0350128 A1  Nov. 21, 2019

Related U.S. Application Data

(60) Provisional application No. 62/671,936, filed on May 15, 2018.

(51) Int. Cl.
*A01C 21/00* (2006.01)
*A01B 49/06* (2006.01)
(Continued)

(52) U.S. Cl.
CPC ............ *A01C 21/005* (2013.01); *A01B 49/06* (2013.01); *A01C 5/062* (2013.01); *A01C 7/20* (2013.01)

(58) Field of Classification Search
CPC ........... A01B 49/06; A01C 5/062; A01C 7/20; A01C 21/005
See application file for complete search history.

(56) References Cited

U.S. PATENT DOCUMENTS 4,248,310 A * 2/1981 McWilliams .......... A01B 63/32
                                                          172/661
6,199,000 B1    3/2001 Keller et al.
(Continued)

FOREIGN PATENT DOCUMENTS

DE         68903856 T3    4/1998
DE    102005010686 A1   10/2005
(Continued)

OTHER PUBLICATIONS

European Search Report issued in counterpart European Patent Application No. 19173801.2 dated Oct. 7, 2019 (8 pages).
(Continued)

*Primary Examiner* — Thomas B Will
*Assistant Examiner* — Ian A Normile

(57) ABSTRACT

An agricultural machine for performing a cultivation operation on a field with plants in a regular, non-square pattern, in parallel, linear rows with a first transverse distance between adjacent rows in a first direction being smaller than a second transverse distance between adjacent rows in a second direction different from the first direction. The agricultural machine is connected to a first set of work units with lateral distances between adjacent work units of the first set of work units corresponding to the first distance, and to a second set of work units which are adapted to be inoperative during operation of the agricultural machine in the first direction and adapted to be operative during operation of the agricultural machine in the second direction to cover the areas between adjacent rows which cannot be treated with the work units of the first set of the work units.

5 Claims, 4 Drawing Sheets

(51) Int. Cl.
*A01C 5/06* (2006.01)
*A01C 7/20* (2006.01)

(56) References Cited

U.S. PATENT DOCUMENTS

| | | | |
|---|---|---|---|
| 8,322,293 B2* | 12/2012 | Wollenhaupt | A01C 7/06 |
| | | | 111/80 |
| 8,600,629 B2 | 12/2013 | Zielke | |
| 9,848,528 B2 | 12/2017 | Werner et al. | |
| 10,004,175 B1* | 6/2018 | Miller | A01C 21/002 |
| 10,375,891 B2* | 8/2019 | Martin | A01D 34/80 |
| 2008/0047475 A1* | 2/2008 | Stehling | A01C 7/081 |
| | | | 111/69 |
| 2013/0124055 A1* | 5/2013 | Baurer | A01C 7/107 |
| | | | 701/50 |
| 2013/0174766 A1 | 7/2013 | Zielke et al. | |
| 2017/0071124 A1 | 3/2017 | Werner et al. | |
| 2017/0290258 A1* | 10/2017 | Mollick | A01B 59/002 |
| 2017/0318736 A1* | 11/2017 | Roberge | A01C 7/00 |

FOREIGN PATENT DOCUMENTS

| | | |
|---|---|---|
| DE | 102011078286 A1 | 1/2013 |
| DE | 102015217496 A1 | 3/2017 |
| DE | 102016207510 A1 | 11/2017 |
| EP | 0868842 A1 | 10/1998 |
| EP | 0916243 A1 | 5/1999 |
| EP | 1415523 A1 | 5/2004 |
| EP | 2227932 A1 | 9/2010 |
| EP | 3476215 A1 * | 5/2019 ............ B05B 12/12 |
| WO | 2012015957 A1 | 2/2012 |
| WO | 2016164914 A1 | 10/2016 |

OTHER PUBLICATIONS

Jiang, W., et al. "Effects of Narrow Plant Spacing on Root Distribution and Physiological Nitrogen Use Efficiency in Summer Maize." The Crop Journal, 2013, No. 1, pp. 77-83.

Karakowa, N. "Machines for Maize Cultivation." Agrartechnik, Issue 3, Mar. 1959, pp. 108-109. (Machine translation attached).

Nichols, M. A. "A Plant Spacing Study with Sweet Corn." New Zealand Journal of Experimental Agriculture, 1974, vol. 2, No. 4, pp. 377-379.

Pawlow, P. "The Mechanization of Rectangular Grid Sowing of Maize." Agrartechnik, 9th Ed., Mar. 1959, pp. 101-104. (Machine translation attached).

Common Planting Patterns in the Orchard, pp. 1-7, [online], [retrieved on Mar. 8, 2021] Retrieved from the Internet <URL: http://www.cropsreview.com/planting-patterns.html>.

\* cited by examiner

METHOD AND MACHINE FOR PLANT CULTIVATION ON A FIELD

TECHNICAL FIELD

The present disclosure relates generally to agricultural machines. More particularly it relates to a method and a machine for providing plant cultivation measures on a field, like removing weeds or applying nutrients or herbicides.

BACKGROUND

Over the last decades, yield increases have been among others a function of increasing seed populations in the field. In growing row crops like corn, for example, there is a trend towards higher populations in the field. Smaller row widths and equidistant plant distances in smaller row widths are likely to come. For example, EP 2227932 A1 mentions a twin-row planting with lateral distances of 19 and 38 cm between adjacent rows and alternating seed positions. In certain applications, this may help maximize the land use, optimize moisture conservation, and capture sunlight but enable also new agronomic degrees of freedom in post-emergence crop protection and nutrient application. As a result of these denser populations, corn plants in the future may be smaller than they have been in the past, due to the smaller available space on the field.

Seeds may be planted in quadratic or regular patterns, which enables certain crop protection and nutrient practices (e.g., mechanical hoeing and fertilizing) in quadratic patterns or clusters. While hoeing and fertilizing operations on plants standing in a square pattern can be done with the same machine in a first direction and in a second, transverse direction, this is not possible to perform with the same machine if the plant pattern is not square-shaped, as it might be required in the future for optimizing plant growth results, as mentioned above. The respective work units of an implement for hoeing or dispensing fertilizer or herbicides need to be located between adjacent rows of plants. If the spacing between adjacent rows is dependent on the working direction, as it is the case if the plants are not in a square pattern, this means that the work units need to be shifted laterally to adapt to the respective row spacing or that different implements are needed for the two different work directions on a field. Both options have disadvantages.

SUMMARY

According to a first aspect, a cultivation operation may be performed on a field on which plants are planted in a regular, non-square pattern with plants in parallel, linear rows with a first transverse distance between adjacent rows in a first direction being smaller than a second transverse distance between adjacent rows in a second direction different from the first direction. The method may include operating an agricultural machine over the field in the first direction, the machine connected to a first set of work units with lateral distances between adjacent work units of the first set of work units corresponding to the first distance, with the work units of the first set of the work units positioned between adjacent rows that extend in the first direction and interact with at least one of the ground between adjacent rows and the plants of at least one of the rows adjacent the respective work unit and operating the agricultural machine over the field in the second direction, with the work units of the first set of the work units positioned between adjacent rows that extend in the second direction and interact with at least one of the ground between adjacent rows and the plants of at least one of the rows adjacent the respective work unit. Due to the first distance between adjacent rows in the first direction being smaller than second distance between adjacent rows in the second direction, areas between adjacent rows in the second direction cannot be treated with the work units of the first set of the work units during operation of the agricultural machine in the second direction. The agricultural machine may be connected to a second set of work units which are inoperative during operation of the agricultural machine in the first direction and operative during operation of the agricultural machine in the second direction to cover the areas between adjacent rows which cannot be treated with the work units of the first set of the work units during operation of the agricultural machine in the second direction.

The work units of the first set of work units can be mounted to a first transverse tool carrier and the work units of the second set of work units can be mounted to a second transverse tool carrier. The second tool carrier can be moved into an operative position during operation of the agricultural machine in the second direction and into an inoperative position during operation of the agricultural machine in the first direction.

The first tool carrier can be mounted at the rear of the agricultural machine and the second tool carrier can be mounted at the front of the agricultural machine. The work units can be adapted to at least one of: hoeing the ground between adjacent rows, fertilizing the plants of at least one of the rows adjacent the respective work unit and supplying a plant protection product, like a herbicide, pesticide or a fungicide to the plants of at least one of the adjacent rows.

The work units of the first set of work units may supply fertilizer to the ground adjacent the plants. This means that when the agricultural machine drives along the first direction, fertilizer bands are laid down between the adjacent rows. When the agricultural machine however drives in the second direction, fertilizer bands are also laid down between the adjacent rows, but no fertilizer is provided where no plants are located, since this area is not covered by the work units of the first set of work units.

The first distance can be half of the second distance and the first and second direction can be orthogonal, although other angles between the first and second direction are possible, for example to achieve a diamond-shaped pattern.

According to another aspect, an agricultural machine may perform a cultivation operation on a field on which plants are planted in a regular, non-square pattern with plants in parallel, linear rows with a first transverse distance between adjacent rows in a first direction being smaller than a second transverse distance between adjacent rows in a second direction different from the first direction is provided. The agricultural machine may be connected to a first set of work units with lateral distances between adjacent work units of the first set of work units corresponding to the first distance, with the work units of the first set of the work units being positionable between adjacent rows that extend in the first direction and adapted to interact with at least one of the ground between adjacent rows and the plants of at least one of the rows adjacent the respective work unit during operation of the agricultural operation in the first direction, while the work units of the first set of the work units are positionable between adjacent rows that extend in the second direction and adapted to interact with at least one of the ground between adjacent rows and the plants of at least one of the rows adjacent the respective work unit during operation of the agricultural operation in the second direction. The agricultural machine may be connected to a second set of work units which are adapted to be inoperative during operation of the agricultural machine in the first direction and adapted to be operative during operation of the agricultural machine in the second direction to cover the areas between adjacent rows which cannot be treated with the work units of the first set of the work units during operation of the agricultural machine in the second direction.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 6 of the drawings.

Figure 1:
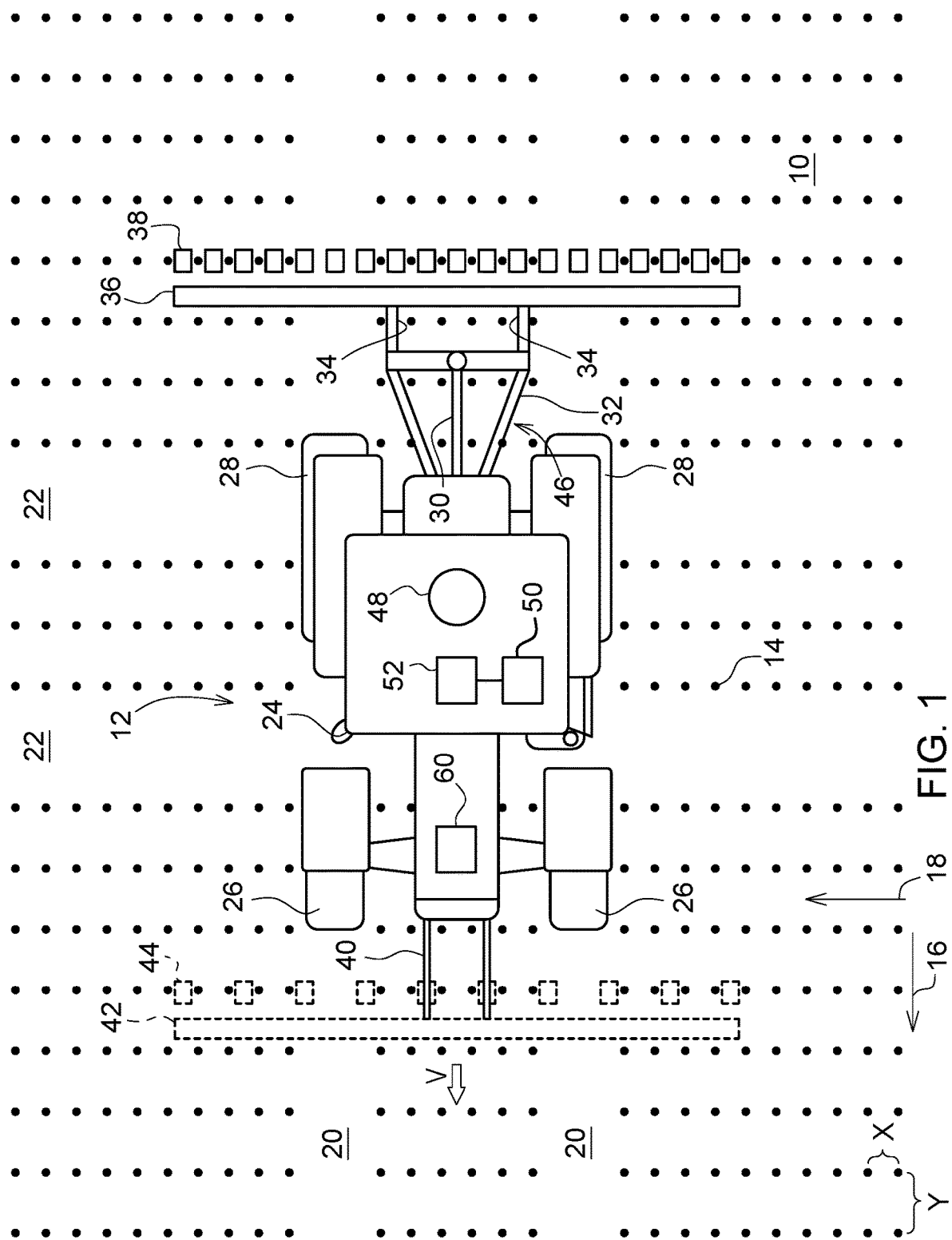
FIG. 1 is a schematic top view of an agricultural machine during a cultivation operation on a field working in a first direction.

FIG. 1 shows a top view of a field 10 on which an agricultural machine 12, comprising a self-propelled vehicle and work units connected thereto, is operating. On the field 10, plants 14 have been planted or sown during a previous work step. The plants 14 are planted in a rectangular pattern with a first transverse distance x in a first (in FIGS. 1 and 2 horizontal) direction 16 between adjacent rows (measured in the direction extending transversely to the first direction 16) and a second transverse distance y in a second (in FIGS. 1 and 2 vertical) direction 18 between adjacent rows (measured in the direction extending transversely to the second direction 18). The distances x and y are different, and x can be half of y. In a possible embodiment, x can be 19.05 cm (7.5 inches) and y can be 38.1 cm (15 inches). Directions 16, 18 are shown as orthogonal, but could alternatively include an angle different from 90 degrees. The plants 14 can be sown or planted in any useful manner, like based on a positioning system (for example, GPS) receiver or using local sensors on the seeding or planting machine. In this respect, reference is made to the prior art (EP 1415523 A1, US 20170071124 A1), the contents of which are incorporated herein by reference.

Hence, the plants 14 are planted on the field 10 in rows, which have a lateral distance with respect to the forward direction v of the agricultural machine 12 that depends on the driving direction of the machine 12. If the machine drives in the first direction 16, the lateral distance between adjacent rows (transverse to the first (forward) direction 16) is x and if the machine drives in the second direction 18, the lateral distance between adjacent rows (transverse to the second (forward) direction) is y, wherein in the embodiment shown, x is smaller than y. Tramlines 20 and 22 can be provided on the field 10, i.e. areas between rows without plants 14, to enable the agricultural machine 12 to drive over the field 10 without damaging plants 14. The tramlines can be provided as described in patent applications U.S. 62/669,018 (dated 9 May 2018, attorney docket number P28021-US-PRO) and U.S. Ser. No. 16/298,689 (dated 11 March 2019, attorney docket number P28021-US-ORD), the contents of each of which are incorporated herein by reference.

The agricultural machine 12 is shown as a tractor with a chassis 24, steerable front wheels 26 and driven rear wheels 28. On the rear end of the chassis 24, a first tool carrier 36 is mounted by means of a three-point hitch 46 with an upper link 30 and lower links 32 connected to arms 34 supporting the first tool carrier 36. On the front end of the chassis 24, a second tool carrier 42 is mounted by means of a front hitch 40. Both hitches 40, 46 can be moved in a vertical direction to lift the tool carriers 36, 42 into an inoperative position for example during turning in the headland.

On the roof of a cab of the agricultural machine 12 an antenna 48 for receiving signals of a positioning system like GPS, Galileo or Glonass is mounted. The signals provided by the antenna 48 are fed to an electronic control unit 50 which is connected to a memory 52 storing a map of the field 10 including information about the position of the plants 14 and the tramlines 20, 22 and controlling an automatic steering system 60 to steer the agricultural machine 12 along the first direction 16 or second direction 18. Alternatively or additionally, automatic steering of agricultural machine 12 could be performed with a camera- or laser-based steering system detecting the plants 14 and/or tramlines 20, 22. In another embodiment, an operator could steer the agricultural machine 12 along the first direction 16 or second direction 18 with the wheels 26, 28 in the tramlines 20, 22.

The first tool carrier 36 supports a first set of work units 38 which are suited for mechanical and/or chemical weed control and/or for providing the plants 14 with nutrients and/or a plant protection product. The work units 38 of the first set are spaced with the lateral distances between adjacent work units corresponding to the first distance x and are positioned, during operation of the agricultural machine 12 in the first direction 16, as shown in FIG. 1, between adjacent rows, which extend in the first direction.

The second tool carrier 42 supports a second set of work units 44 which are suited for mechanical and/or chemical weed control and/or for providing the plants 14 with nutrients and/or a plant protection product. The work units 44 of the second set are spaced with the lateral distances between adjacent work units corresponding to the second distance y.

While working in the first direction 16, the second tool carrier 42 with the second set of work units 44 is brought into an inoperative position by the front hitch 40, as indicated in FIG. 1 with the broken lines, since the second set of work units 44 is not required when the agricultural machine 12 moves in the first direction 16. The actuation of the front hitch 40 can be performed by the operator of machine 12 or automatically based upon signals from antenna 48 indicating the direction of machine 12.

Figure 2:
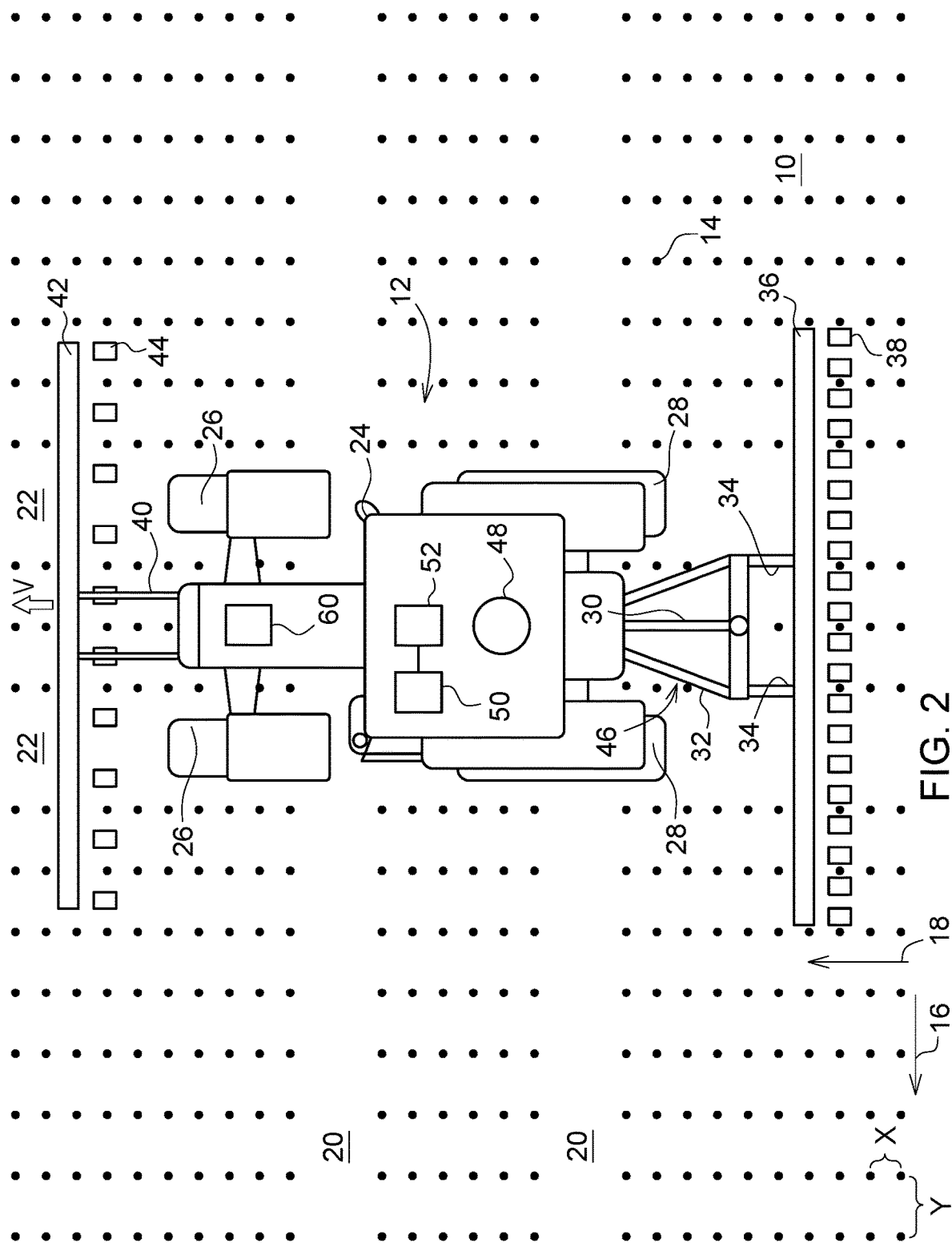
FIG. 2 is a schematic top view of the agricultural machine of FIG. 1 during a cultivation operation on a field working in a second direction.

Since the second distance y is larger than the first distance x, when the machine 12 is driving in the second direction 18, areas between the rows would be uncovered by the work units 38, as can be seen in FIG. 2. Thus, the second tool carrier 42 with the second set of work units 44 is brought into an operative position by the front hitch 40, as indicated in FIG. 2, since the second set of work units 44 is needed to cover these parts of the field 10 when the agricultural machine 12 moves in the second direction 18. The actuation of the front hitch 40 can be performed by the operator of machine 12 or automatically based upon signals from antenna 48 indicating the direction of machine 12. Thus, the same machine 12 can be used to perform cultivating operations on the field 10 in both directions 16, 18, with the only change being to move the second set of work units 44 into the inoperative position when working in the first direction 16 and moving the second set of work units into the operative position when working in the second direction 18.

Figure 3:
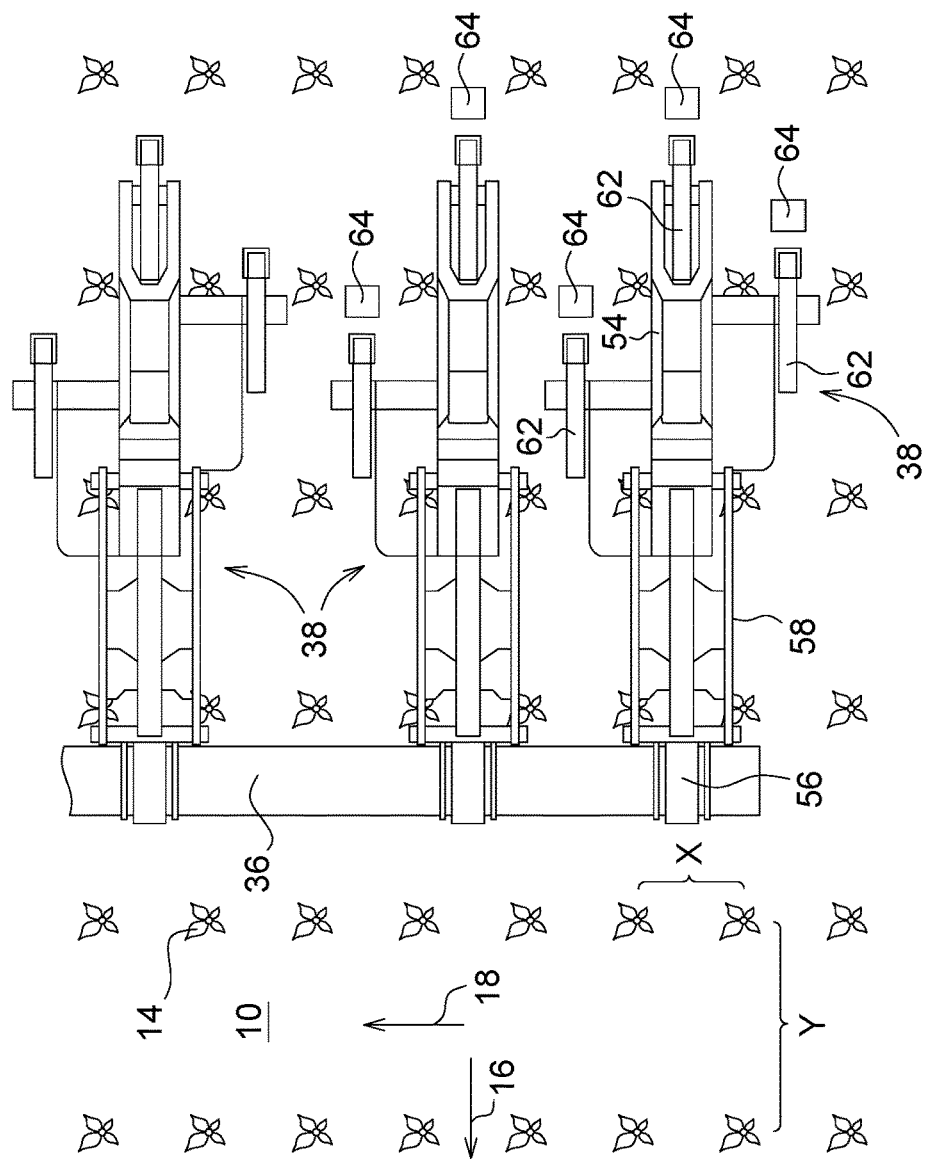
FIG. 3 is a top view of a number of first work units of the agricultural machine of FIGS. 1 and 2.

FIG. 3 shows an embodiment of the first set of work units 38. A supporting frame 54 is connected by a bracket 56 to the first tool carrier 36 and supported on a wheel 58. The frame 54 carries two or three ground-engaging hoes 62, located laterally between adjacent rows of plants 14.

Figure 4:
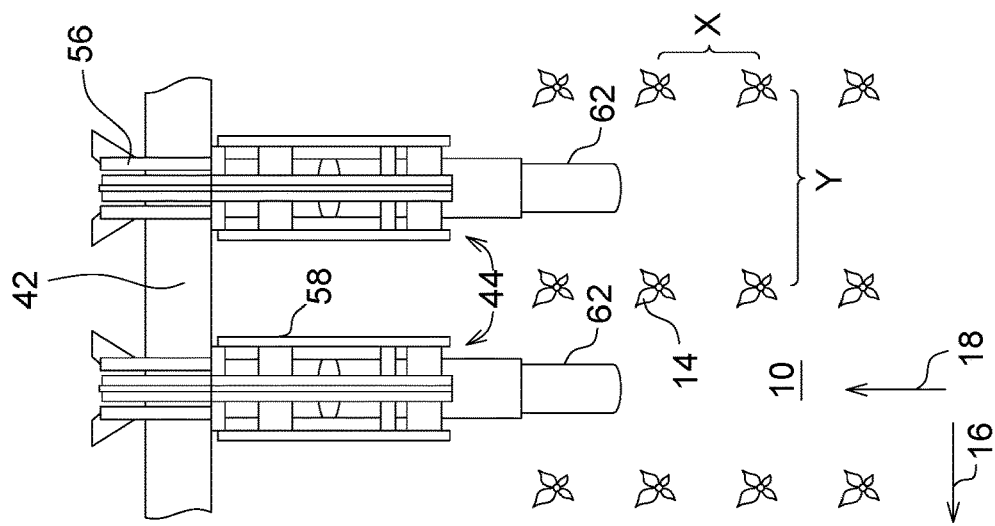
FIG. 4 is a top view of a number of second work units of the agricultural machine of FIGS. 1 and 2.

FIG. 4 shows an embodiment of the second set of work units 44. A supporting frame 54 is connected by a bracket 56 to the second tool carrier 42 and supported on a wheel 58. The frame 54 carries one ground-engaging hoe 62, located laterally between adjacent rows of plants 14, and covering the ground that, when driving in the second direction 18, cannot be hoed by the work units 38 of the first set of work units 38.

Figure 5:
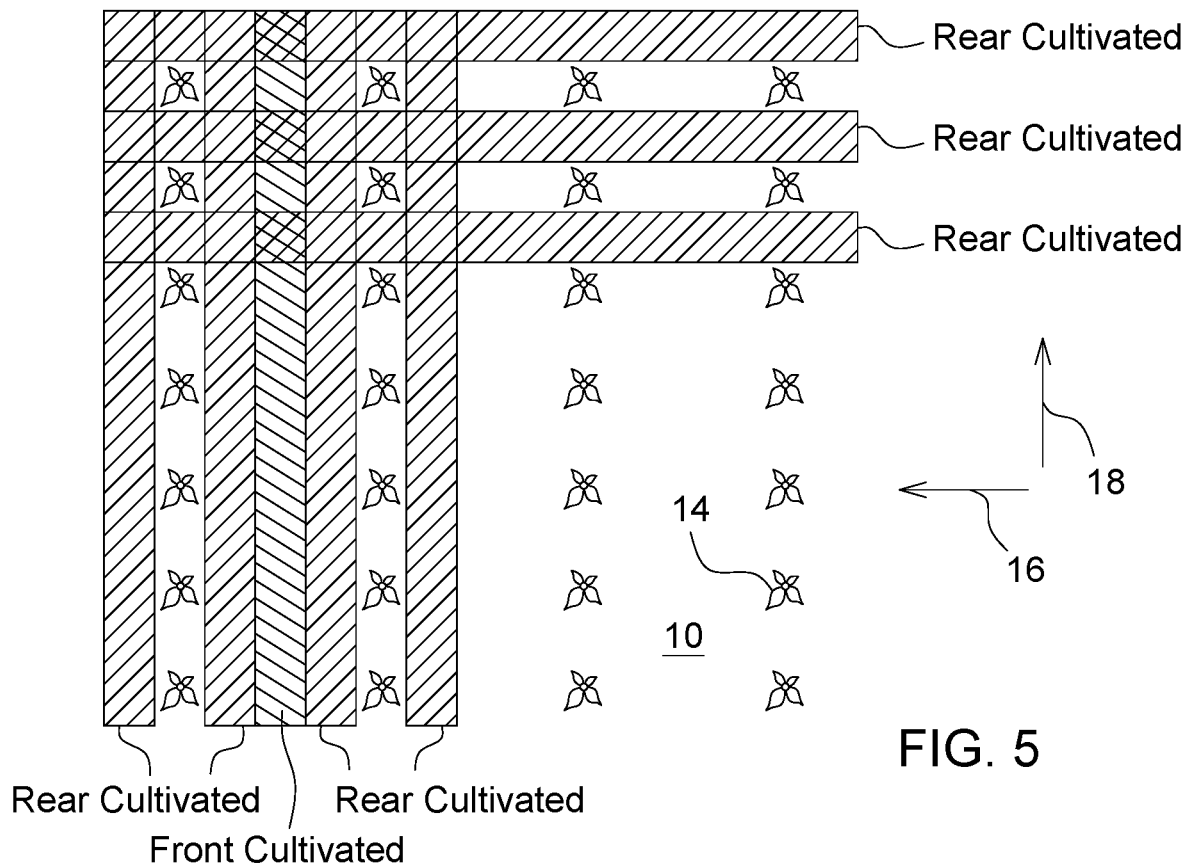
FIG. 5 is a schematic view of areas of the field covered during a hoeing operation with the agricultural machine of FIGS. 1 and 2.
Figure 6:
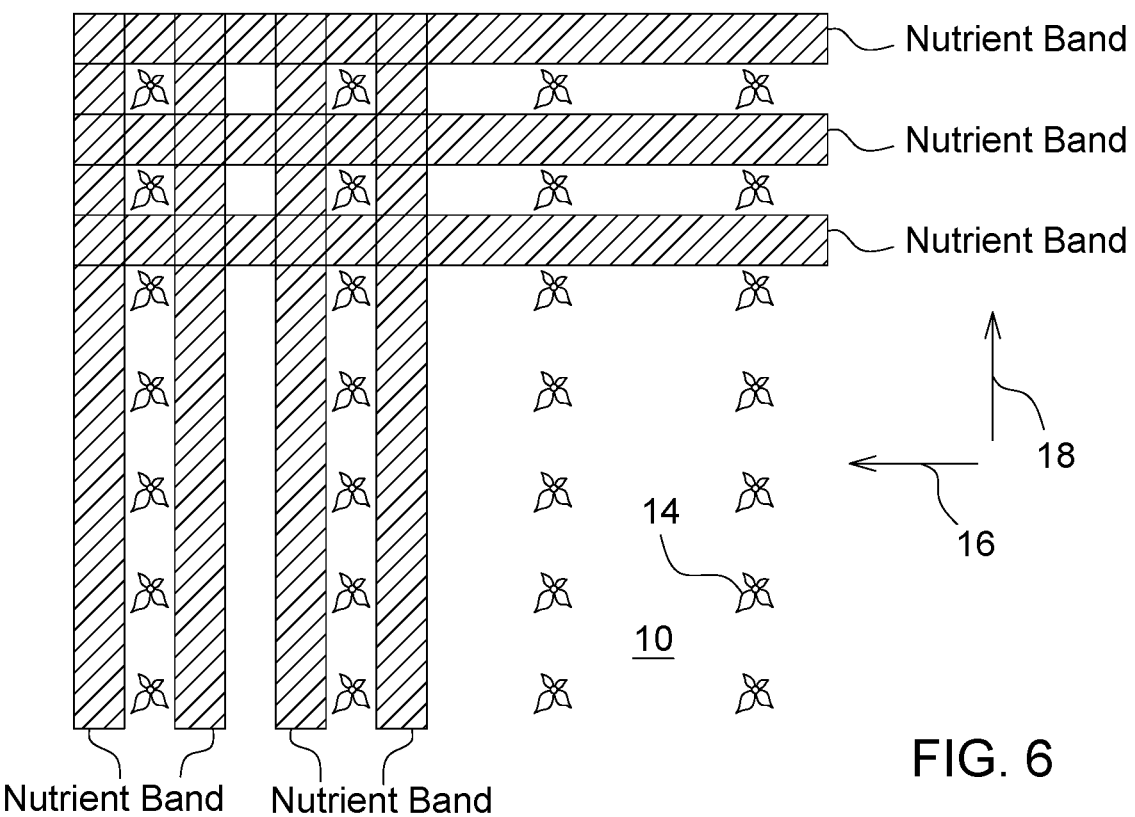
FIG. 6 is a schematic view of areas of the field covered during a fertilizing operation with the agricultural machine of FIGS. 1 and 2.

FIG. 5 indicates which parts of the ground are cultivated with the work units 38 of the first set of work units 38, indicated as "rear cultivated", since the first tool carrier 36 is mounted at the rear of agricultural machine 12, and with the work units 44 of the second set of work units 44, indicated as "front cultivated", since the second tool carrier 42 is mounted at the front of agricultural machine 12.

It would be possible to provide the work units 38 of the first set of work units 38 with fertilizer dispensers 64, as shown in FIG. 3. In this case, the fertilizer would only be distributed by the work units 38, yielding the distribution indicated in FIG. 6. The second set of work units 44 does not need to be provided with fertilizer dispensers 64, since they would cover areas without plants 14.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method of performing a weed removal, nutrient application, or herbicide application operation on a field on which plants are planted in a regular, non-square pattern with the plants in parallel, linear rows with a first transverse distance between adjacent rows in a first direction being smaller than a second transverse distance between adjacent rows in a second direction different from the first direction, with the following steps:

operating an agricultural machine over the field in the first direction, the machine connected to a first set of work units with lateral distances between adjacent work units of the first set of work units corresponding to the first distance, the work units of the first set of work units positioned between adjacent rows that extend in the first direction and interacting with at least one of the ground between adjacent rows and the plants of at least one of the adjacent rows; and operating the agricultural machine over the field in the second direction, the work units of the first set of the work units positioned between adjacent rows that extend in the second direction and interacting with at least one of the ground between adjacent rows and the plants of at least one of the adjacent rows;

wherein due to the first distance between adjacent rows in the first direction being smaller than the second distance between adjacent rows in the second direction, areas between adjacent rows in the second direction cannot be treated with the work units of the first set of the work units during operation of the agricultural machine in the second direction;

wherein the agricultural machine is connected to a second set of work units which are inoperative during operation of the agricultural machine in the first direction and operative during operation of the agricultural machine in the second direction to cover the areas between adjacent rows which cannot be treated with the work units of the first set of the work units during operation of the agricultural machine in the second direction; and wherein the work units of the first set of work units and the work units of the second set of work units are each at least one of hoeing the ground between adjacent rows, fertilizing the plants of at least one of the rows adjacent the respective work unit, and supplying a plant protection product to the plants of at least one of the adjacent rows.

2. The method of claim 1, wherein the work units of the first set of work units are mounted to a first transverse tool carrier and the work units of the second set of work units are mounted to a second transverse tool carrier, the second tool carrier moved into an operative position during operation of the agricultural machine in the second direction and into an inoperative position during operation of the agricultural machine in the first direction.

3. The method of claim 2, wherein the first tool carrier is mounted at the rear of the agricultural machine and the second tool carrier is mounted at the front of the agricultural machine.

4. The method of claim 1, wherein only the work units of the first set of work units are supplying fertilizer to the ground between adjacent rows the plants.

5. The method of claim 1, wherein the first distance is half of the second distance and the first and second direction are orthogonal.

* * * * *